United States Patent Office 2,909,450
Patented Oct. 20, 1959

2,909,450

IMPREGNATING SOLUTIONS AND METHOD OF IMPREGNATION THEREWITH

Irving S. Goldstein, Pittsburgh, Pa., assignor to Koppers Company, Inc., a corporation of Delaware No Drawing. Application June 27, 1956
Serial No. 594,090

13 Claims. (Cl. 117—161)

This invention relates to aqueous solutions comprising furfuryl alcohol and more particularly to stable, catalyzed, aqueous solutions comprising furfuryl alcohol useful in the resin and related fields for attaining chemical resistance, more particularly alkali resistance. In particular, the invention is concerned with methods for coating and impregnating porous and fibrous materials with such solutions and forming chemically-resistant resins therefrom in situ.

Prior to this invention it was known that furfuryl alcohol by itself or mixed with small proportions of furfural could be polymerized to the solid state with a polymerization catalyst. For example, when furfuryl alcohol is mixed with 1 to 2% by weight of a mineral acid catalyst, vigorous exothermic reaction occurs and a black, porous, infusible, insoluble resin is formed. With smaller proportions of a mineral acid catalyst, even though the furfuryl alcohol may be diluted with a relatively large proportion of water, the alcohol polymerizes to a viscous, tacky semi-solid resin.

In Reineck U.S. 2,367,312, it is disclosed that aqueous solutions containing less than 50% by weight of furfuryl alcohol, at least approximately 35% by weight of furfural and a mineral acid catalyst can be prepared, which solutions are allegedly storage stable. However, when polymerization is induced, the relatively high proportion of furfural results in a decreased yield of resinous product having lower alkali resistance. Additionally, the presence of free acid renders the resin unsatisfactory for many ultimate uses.

It now has been discovered that stable, aqueous solutions containing a preponderance of furfuryl alcohol can be prepared which are useful in the resin and allied fields for imparting chemical resistance to various materials and which are particularly useful for impregnating porous and fibrous materials such as wood, stone, concrete, refractories, insulation, porous metal, plaster, asbestos, etc. In particular, the compositions of this invention are eminently suitable for impregnating wood to produce alkaliresistant wood having dimensional stability.

Compositions having the foregoing properties and uses result from the unexpected discovery that a small quantity of an acidic catalyst selected from the group consisting of nitrates of cadmium, cobalt, nickel and zinc; zinc chloride; the dibasic and tribasic organic acids having an ionization constant for the first hydrogen approximating $1 \times 10^{-3}$ of which malonic, citric, fumaric, phthalic and tartaric are representative; and salts of strong mineral acids with quinoline, such as quinoline hydrochloride, quinoline phosphate, and quinoline sulfate, can be used to obtain compositions which are stable to resinification and homogeneous at room temperature.

The foregoing catalysts, surprisingly, can be employed in small amount, specifically from 0.5 to 10% by weight of the resin-forming ingredients.

The resin-forming, aqueous solutions of this invention may be represented as follows, the percentages given being by weight:

| | Percent |
|---|---|
| Furfuryl alcohol | 65–99 |
| Furfural | 0–25 |
| Catalyst | 0.5–10 |
| Water | 0.5–19.5 |

Compositions within the foregoing ranges can be prepared conveniently by mixing the catalyst with part or all of the water to form an aqueous solution, and this solution is then mixed with the furfuryl alcohol and furfural, or with the combined furan derivatives. The furfuryl alcohol and furfural constituents of the solutions of this invention are calculated to total 87.5 to 99.5% of the non-aqueous constituents.

It was entirely unexpected that compositions containing such a high percentage of furfuryl alcohol, 65% or more, with a catalytic amount of the foregoing catalysts, could be prepared, and that these compositions would have such properties as being storage stable at room temperature and easily resinified at elevated temperatures. These properties are completely contrary to what would be expected in view of the prior art. It was equally surprising that the inorganic acid salts of the group described similarly give stability with such high concentrations of furfuryl alcohol and good resin yields at elevated temperatures.

The invention may be best illustrated by reference to the following examples which are illustrative and not limitative. All parts are by weight unless otherwise specified.

EXAMPLE I

| | |
|---|---|
| Furfuryl alcohol | 72 |
| Furfural | 18 |
| $ZnCl_2$ | 5 |
| Water | 5 |
| | 100 |

The zinc chloride is dissolved in the water and stirred into the mixture of furfuryl alcohol and furfural to give a homogeneous, stable solution, which can be stored for three months with an appreciable polymerization evident (viscosity 8 centipoises initially, 9.0 after three months at 25° C., Brookfield viscometer). Substantially similar results are obtained when equivalent amounts of hydrates of cadmium, cobaltous, nickel and zinc nitrates are substituted for zinc chloride.

EXAMPLE II

| | |
|---|---|
| Furfuryl alcohol | 90.0 |
| $ZnCl_2$ | 5.0 |
| Water | 5.0 |
| | 100.0 |

The zinc chloride is dissolved in the water and stirred into the furfuryl alcohol. A stable homogeneous product is obtained, suitable for coating and impregnating wood for in situ resin formation. After standing for three months at 25° C., its viscosity is 8.5 centipoises, compared with an initial value of 8 centipoises. Substantially similar results are obtained when citric acid, malonic acid, and quinoline hydrochloride are substituted for zinc chloride.

EXAMPLE III

Products of this invention are used to impregnate southern yellow pine at room temperature and a pressure of 150 p.s.i., using the well-known empty cell process. After resinification at elevated temperatures, as shown infra, the wood is exposed to boiling 10% NaOH. Test data are tabulated in Table I.

Table I

EFFECT OF DURATION OF EXPOSURE TO BOILING 10% NaOH UPON CRUSHING STRENGTH OF UNTREATED AND FURFURYL ALCOHOL RESIN-TREATED SOUTHERN YELLOW PINE

| Treatment | Retention of Soln. (lbs./cu. ft.) | Resin Content (lbs./cu. ft.) | Resin Content (Percent of Dry Wood) | Duration of Exposure to 10% NaOH, days | Avg. Loss in wt. (Percent) | Avg. Moisture Content (Percent of Dry Wood) | Avg. Crushing Strength at Elastic Limit (p.s.i.) |
|---|---|---|---|---|---|---|---|
| Untreated | | | | Unexposed | | 121 | 620 |
| Do | | | | 1 | 21 | 170 | 160 |
| Do | | | | 2 | 23 | 189 | 100 |
| Do | | | | 4 | 26 | 203 | 90 |
| Do | | | | 9 | 29 | 212 | 70 |
| Do | | | | 16 | 32 | 216 | 80 |
| (90% furfuryl alcohol-furfural (4:1), 5% H₂O, 5% ZnCl₂, Cured at 100° C. for 24 hours) | 39.1 | 26.6 | 67 | Unexposed | | 66 | 2,650 |
| Do | 41.5 | 28.6 | 70 | 1 | 5 | 89 | 2,400 |
| Do | 40.7 | 27.7 | 71 | 2 | 8 | 99 | 1,780 |
| Do | 40.7 | 28.1 | 70 | 4 | 10 | 109 | 1,290 |
| Do | 40.7 | 28.1 | 73 | 9 | 12 | 123 | 990 |
| Do | 40.3 | 27.4 | 71 | 16 | 12 | 124 | 890 |
| Untreated | | | | Unexposed | | 112 | 650 |
| Do | | | | 4 | 21 | 174 | 105 |
| (90% furfuryl alcohol, 5% ZnCl₂, 5% H₂O, Cured at 105° C. for 24 hours) | 14.8 | 10.2 | 28 | Unexposed | | 94 | 1,460 |
| Do | 12.2 | 9.0 | 24 | 4 | 20 | 168 | 290 |
| Do | 13.9 | 10.2 | 27 | Unexposed | | 78 | 1,680 |
| Do | 13.8 | 10.2 | 26 | 4 | 18 | 157 | 400 |
| Do | 17.4 | 12.7 | 32 | Unexposed | | 74 | 2,320 |
| Do | 17.6 | 13.0 | 33 | 4 | 15 | 144 | 490 |
| Do | 21.2 | 14.4 | 37 | Unexposed | | 74 | 1,810 |
| Do | 21.0 | 14.4 | 38 | 4 | 15 | 147 | 500 |

In impregnating wood so as to attain chemical resistance, no particular difficulty is encountered since the solutions containing furfuryl alcohol are of low viscosity. Because of their low viscosity, penetration into the cell structure of the wood with subsequent in situ resinification makes possible the attainment of alkali- and acid-resistant, dimensionally stable impregnated wood. The resin then becomes an integral part of the wood cell-wall structure.

With regard to process, all of the known impregnation processes, such as the empty cell and the full cell methods, can be used with equivalent results for equal impregnations at room temperature, suitably with a gauge pressure of 150 p.s.i. Depending upon the degree of impregnation desired, these conditions can be varied. For all general purposes, a resultant resin impregnation of at least about 25% is required for improvement in crushing strength after exposure to boiling 10% NaOH. Specific applications may call for a greater or lesser degree of ultimate impregnation.

In accordance with this invention additional materials of a porous or fibrous nature which can be treated in accordance with this invention were treated as follows.

Dried samples of the materials listed in Table II found below, were weighted in a pan and covered with the aqueous, catalyzed solution of Example II. The pan was placed in a treating cylinder and a vacuum of 27 inches of mercury was applied for 20 minutes. Thereafter a pressure of 150 p.s.i. was applied for one hour. The impregnated specimens were then removed from the treating solution and placed in an oven at 95 to 100° C. to cure for 18 to 24 hours.

The materials treated and the results obtained in each example are shown below in Table II.

Table II

TREATMENT OF POROUS AND FIBROUS MATERIALS WITH ZINC CHLORIDE CATALYZED FURFURYL ALCOHOL SOLUTION

| Example | Description of Material | Volume in Cu. Inches | Dry Weight (g.) | Wt. after Impregnation (g.) | Retention of Solution (g.) | Porosity [1] (Percent) | Wt. after Curing (g.) | Wt. of Cured Resin (g.) | Resin Retention Percent of Dry Weight | Resin Retention lbs./cu. ft. | Yield (Percent) |
|---|---|---|---|---|---|---|---|---|---|---|---|
| IV | JM-20 Insulating Fire Brick [2] | 111 | 2,018 | 3,600 | 1,582 | 75 | 2,960 | 942 | 47 | 32.4 | 60 |
| V | JM 16-20 Insulating Fire Brick [3] | 90 | 841 | 2,345 | 1,504 | 88 | 1,575 | 734 | 87 | 31.0 | 49 |
| VI | JMC-22 Sil-o-Cel Insulating Fire Brick [4] | 92 | 1,053 | 2,452 | 1,399 | 80 | 2,020 | 967 | 92 | 40.1 | 69 |
| VII | Asbestos Cord Woven Ring (soft and flexible) | not measured | 50.7 | 80.7 | 30.0 | | 67.8 | 17.1 | 34 | | 57 |
| VIII | Glass Fiber Insulation | do | 7.9 | 90.5 | 82.6 | | 64.4 | 56.5 | 715 | | 68 |
| IX | Laminated Cardboard | do | 39.9 | 88.5 | 48.6 | | 64.1 | 24.4 | 61 | | 50 |
| X | Magnesia Insulation | 54 | 150 | 1,118 | 968 | 94 | 842 | 692 | 460 | 48.9 | 72 |
| XI | Sandstone | 44 | 1,340 | 1,498 | 158 | 19 | 1,432 | 92 | 7 | 8.0 | 58 |
| XII | Molded Plaster | 7.0 | 108.4 | 186.4 | 78 | 59 | 162.9 | 54.5 | 50 | 29.7 | 70 |
| XIII | Porous Metal Filter [5] | 8.4 | 819 | 859 | 40 | 25 | 845 | 26 | 3 | 11.8 | 65 |

[1] Porosity was calculated as 100 times the ratio of the volume of treating solution retained to the volume of the specimen. Voids not accessible to the treating solution were neglected.
[2,3,4] Commercially available from Johns-Manville.
[5] Heated in benzene and acetone prior to impregnation to remove impregnated oil.

The property headings in Table II are, in most instances, self-explanatory. To avoid any uncertainty in terms, the resin retention may be defined as the weight percent of cured resin based on the weight of the dry material before impregnation. The yield (percent) is calculated by dividing the final weight of the curved resin by the number of grams of monomer solution retained in the material after impregnation and before curing (retention of solution).

Impregnation with the catalyzed, aqueous, stable solutions, as evidenced by the data, improved important properties of the materials treated. For example, the sandstone and plaster specimens would no longer absorb water after treatment. Hydrochloric acid which readily attacked the limestone binder of the untreated sandstone ran off treated sandstone without any harmful effect. Before treatment the magnesia insulation was soft and weak. After impregnation with the treating solution it became hard, strong, and would no longer absorb water. The original soft and flexible asbestos fiber ring became hard and stiff after treatment.

The resin retention of some of the materials as shown in Table II is relatively low, but should not be interpreted in a misleading light since for these materials, due to their low porosity, only a small quantity of resin is required to give the desired properties to the treated material. Additional instances in which the resin retention is relatively low but the products superior in the desired properties are shown in connection with carbon shapes in the following examples. In these examples the purpose of the treatment was to reduce porosity and thereby render the materials impervious to the passage of gases and liquids.

EXAMPLE XIV

Ten carbon electrodes were treated with the solution of Example II and cured in the manner of the foregoing examples. This procedure was repeated and the average resin yield obtained with all of the electrodes was 72%. The first treatment reduced the porosity from 28% to 9.8% which was further reduced to 1.6% after the second impregnation.

EXAMPLE XV

Ten carbon seals having an initial low porosity were impregnated by the full cell process with the solution of Example II. A vacuum of 26 inches of mercury was applied for one-half hour followed by a pressure period of one hour at 150 p.s.i. The resin retention (average of all seals) was 7.0% and the resin yield (average of all seals) was 75%. The change in apparent density increased (average) from 1.70 to 1.80–1.85.

To further illustrate the process of this invention with manufactured wood products, a pressed wooden fiber product known as "Nu-Wood," manufactured by the Wood Conversion Company, was treated as follows.

A board one-half inches thick, of the foregoing description, was treated with the solution of Example II and then kept under 150 p.s.i. for 30 minutes. The board was then placed in a convection oven maintained at 90° C. and cured overnight. The resin yield was 73% and the product was dense and strong.

The solutions of this invention contain a large preponderance of furfuryl alcohol. When admixed with furfuryl, such solutions contain not less than 65% furfuryl alcohol for good resinification. The amount of water in solution is between 0.5 and 19.5%. The catalyst is varied from 0.5 to 10% by weight, based on the entire composition.

In polymerizing the compositions of this invention, a curing temperature of at least 40° C. is necessary. However, to avoid inordinately long curing times, temperatures of 80 to 105° C. are preferred. About 24 hours at 100° C. suffices, other temperatures requiring proportionately longer or shorter curing time.

What is claimed is:

1. A solution, storage-stable at room temperatures, containing a resin forming impregnator consisting essentially of 65–99% by weight of furfuryl alcohol, 0.5–15% by weight water, and 0.5–10% by weight of a catalyst selected from the group consisting of cadmium nitrate, cobaltous nitrate, nickel nitrate, zinc nitrate, zinc chloride, and dibasic and tribasic organic acids having an ionization constant for the first hydrogen of about $1 \times 10^{-3}$.

2. A solution, storage-stable at room temperatures, containing a resin forming impregnator consisting of 65–99% by weight of furfuryl alcohol, up to 25% by weight of furfural, 0.5–15% by weight water, and 0.5–10% by weight of a catalyst selected from the group consisting of cadmium nitrate, cobaltous nitrate, nickel nitrate, zinc nitrate, zinc chloride, and dibasic and tribasic organic acids having an ionization constant for the first hydrogen of about $1 \times 10^{-3}$.

3. In a method of treating a porous material with liquid furan resin forming materials, the improvement comprising imparting alkali resistance to said material by impregnating said material with a solution, storage-stable at room temperatures, containing a resin forming impregnator consisting essentially of 65–99% by weight of furfuryl alcohol, 0.5–15% by weight water, and 0.5–10% by weight of a catalyst selected from the group consisting of cadmium nitrate, cobaltous nitrate, nickel nitrate, zinc nitrate, zinc chloride, and dibasic and tribasic organic acids having an ionization constant for the first hydrogen of about $1 \times 10^{-3}$, in sufficient quantity to permeate the pores of said material, whereby a quantity of said solution is retained by said material, and heating the impregnated material at temperatures of 60–105° C. to form therein, in situ, a cured furan resin representing at least 50% by weight of the furan monomer in said quantity of said solution retained by said material.

4. A method according to claim 3 wherein said impregnator contains up to 25% furfural.

5. A stable, aqueous solution consisting of 72% furfuryl alcohol, 18% furfural, 5% zinc chloride and 5% water by weight.

6. A stable, aqueous solution consisting of 90% furfuryl aclohol, 5% zinc chloride and 5% water by weight.

7. A resin-yielding solution storage stable at room temperature consisting of at least 65% furfuryl alcohol, up to 25% furfural, 0.5–19.5% water and an acidic catalyst selected from the group consisting of cadmium nitrate, cobaltous nitrate, nickel nitrate, zinc nitrate, zinc chloride and the dibasic and tribasic organic acids having an ionization constant for the first hydrogen of approximately $1 \times 10^{-3}$, the furfuryl alcohol and furfural totalling from 87.5% to 99.5% of the non-aqueous constituents.

8. Composition of claim 7 in which the catalyst is zinc chloride.

9. Method of claim 3 in which the material impregnated is a porous metal.

10. Method of claim 3 in which the material impregnated is asbestos.

11. Method of claim 3 in which the material impregnated is wood.

12. Method of claim 3 in which the material impregnated is a magnesia insulation.

13. Method of claim 3 in which the material impregnated is sandstone.

References Cited in the file of this patent

UNITED STATES PATENTS

| | | |
|---|---|---|
| 2,174,887 | Kiefer | Oct. 3, 1939 |
| 2,366,049 | Payne et al. | Dec. 26, 1944 |
| 2,367,312 | Reineck | Jan. 16, 1945 |
| 2,584,681 | Dunlop | Feb. 5, 1952 |

FOREIGN PATENTS

| | | |
|---|---|---|
| 625,847 | Great Britain | July 5, 1949 |

UNITED STATES PATENT OFFICE
CERTIFICATE OF CORRECTION

Patent No. 2,909,450

October 20, 1959

Irving S. Goldstein

It is hereby certified that error appears in the printed specification of the above numbered patent requiring correction and that the said Letters Patent should read as corrected below.

Column 2, line 42, for "with an" read -- with no --; column 5, line 50, for "furfuryl" read -- furfural --.

Signed and sealed this 22nd day of March 1960.

(SEAL)
Attest:

KARL H. AXLINE
Attesting Officer

ROBERT C. WATSON
Commissioner of Patents